Jan. 1, 1929.
J. M. MOORE
1,697,657
DAY AND NIGHT LICENSE FOR MOTOR VEHICLES
Filed May 24, 1928
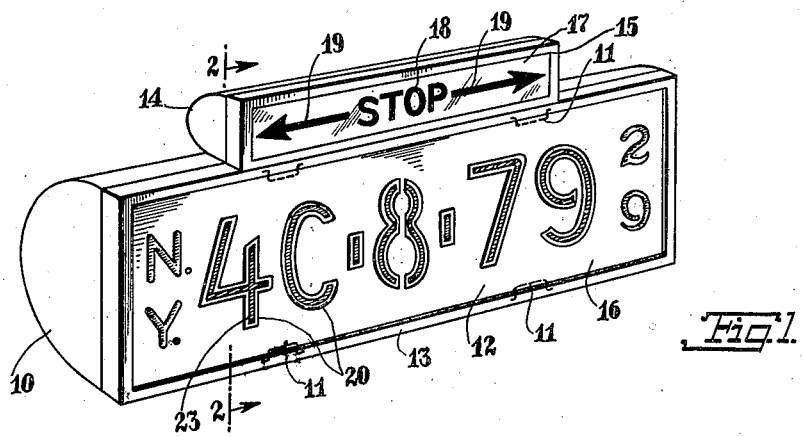
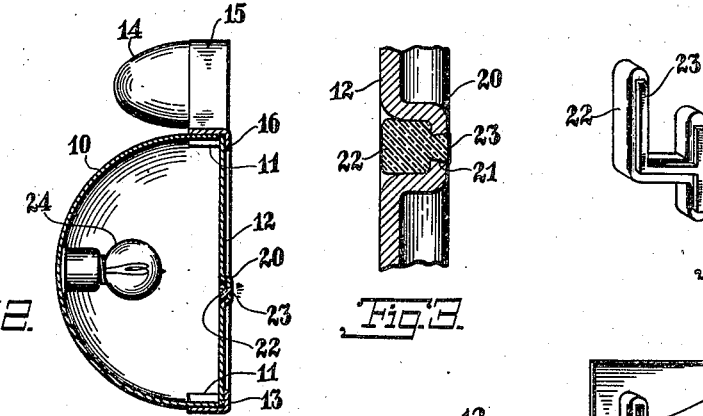
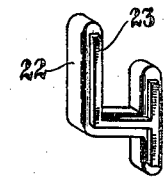
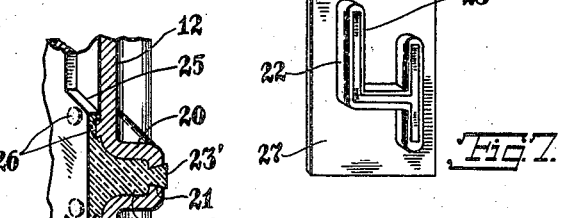
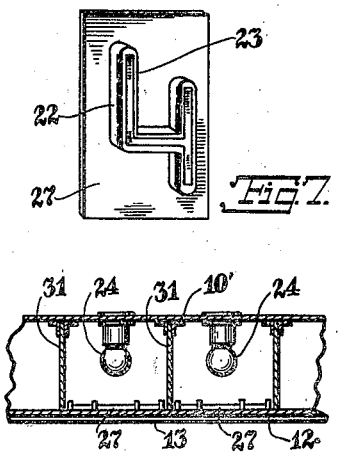
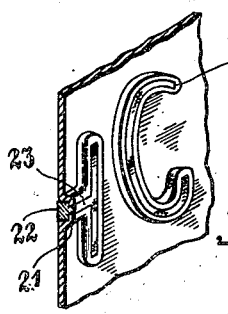
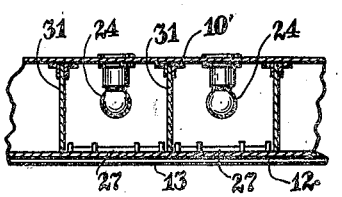
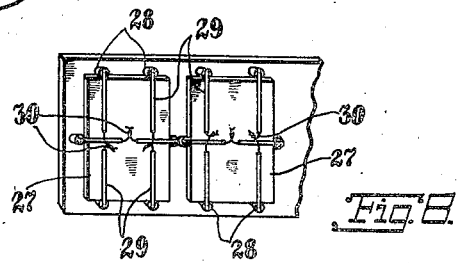
INVENTOR.
John M. Moore
BY
ATTORNEY Patented Jan. 1, 1929.

1,697,657

UNITED STATES PATENT OFFICE.

JOHN M. MOORE, OF NEW YORK, N. Y.

DAY AND NIGHT LICENSE FOR MOTOR VEHICLES.

Application filed May 24, 1928. Serial No. 280,170.

This invention relates generally to license plates for vehicles and has more particular reference to a novel day and night license plate.

The invention has for an object the provision of a device of the class mentioned which is of simple durable construction, desirable and efficient in action, and which can be manufactured and sold at a reasonable cost.

The device proposes the use of a license plate with outwardly embossed numbers and letters having central cutout portions and glass letters preferably coloured, inserted in the said cutout portions for being adapted to be illuminated so as to be visible in the night. This license plate may be supported in a casing provided with lights arranged for accomplishing the said illumination.

It is pointed out that this license plate will be clearly readable on the darkest night. The common license plates lack this feature, though the advisability thereof has been generally recognized. Quite obviously the instant arrangement will not affect the legibility of the license plate for day reading, in fact it is thought that it adds to this quality since the glass letters will be prominently surrounded by a border.

An auxiliary casing with a stop sign, and right and left directional arrows may be added upon the license casing, and lights may be arranged therein for the operation of these signs.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:

Fig. 1 is a perspective view of a device constructed according to this invention.

Fig. 2 is a transverse vertical sectional view thereof, taken on the line 2—2 of Fig. 1.

Fig. 3 is an enlarged detail view of a portion of the license plate shown in Fig. 2.

Fig. 4 is a fragmentary perspective view of the license plate shown in Fig. 2.

Fig. 5 is a perspective view of one of the glass numbers used in the said license plate.

Fig. 6 is a view similar to Fig. 3, but perspective and illustrating a modified form of the device.

Fig. 7 is a perspective view of one of the glass plates used in a further modified form of the device.

Fig. 8 is a fragmentary rear perspective view of a license plate using the glass plates shown in Fig. 7.

Fig. 9 is a fragmentary horizontal sectional view of a modified form of device using the plates shown in Fig. 7.

The reference numeral 10 indicates generally a license plate casing of curved rear contour, and provided with a plurality of stop members 11 against which license plate 12 rests, and a front cover 13 engaged on the casing holds the license plate in place. A smaller top auxiliary casing 14 is attached to the casing 10, and an extension 15 from the cover 13 engages over the front of this casing. Nearly the entire front sides of the cover 13 and extension 15 are cut away, forming openings 16 and 17 respectively.

A stop sign 18, and right and left directional signs 19 are mounted in the casing 14 directly behind the opening 17. The casing 14 has its rear side curved outwardly, and is adapted to support lights for illuminating these signs, these lights being connected for operation according to whether a vehicle carrying the device is about to stop, or turn.

The license plate 12 has outwardly embossed letters and numbers 20 having central cutout portions 21. Glass letters 22 are engaged in the hollows formed by the embossed letters and have front reduced portions 23 projecting thru the cutout portions 21. The sides of these reduced portions are inclined as seen in Fig. 3 and the embossed letters 20 are squeezed together for causing the metal adjacent the cutouts 21 to enter behind the inclined sides for holding the glass letters in place. Preferably these glass letters are of coloured glass.

Lamps 24 are supported in the casing 10 directly behind the plate 12 for illuminating the glass letters when lit. The glass letters may be the same colour as the colour of the embossed letters 20 for not interfering with the legibility of the said letters, or the glass letters may be of a different colour or shade for adding to the legibility of the letters by providing bordered letters. In the dark and when the lamps 24 are lit, the glass letters will be very prominent and legible.

The modified form of the device illustrated in Fig. 6 discloses the letters 22′ with front reduced portions 23′ having parallel sides and engaging in the cutout portions 21, and with rear flanges 25 engaging against the rear of the license plate and thus held by tapered projections 26 secured to the plate and engaging in the flanges 25. This may be produced by casting the glass letters against the license plate.

In Fig. 7 a glass plate 27 is integral with the letters 22. Each of the glass letters used in the license plate should be similarly mounted.

In Fig. 8 the license plate 12′ has a plurality of posts 28 projecting from the rear side thereof arranged for supporting the glass plates 27 and a plurality of arms 29 are pivotally connected to the posts 28 and extend across the rear side of the plates 27. The said posts and arms are arranged in opposite pairs so that adjacent ends may be fastened together with wires 30 for holding the arms so as to hold the plates in place.

In Fig. 9 the casing 10′ is shown as provided with transverse partitions 31 for forming separate compartments for the lamps 24 and the plates 27.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A license plate, comprising a plate having embossed symbols with central cutout portions, glass plates engaged in the rear of the said plate and having integral symbols extending into the hollows formed by the embossed letters and integral projections extending into the said cutout portions, posts projecting from the rear of the said plate and arranged for supporting the said glass plates, arms pivoted to the posts, the arms and posts being arranged in opposite pairs, and wires securing the adjacent ends of the arms together.

2. A license plate, comprising a plate having embossed symbols with central cutout portions, glass plates engaged in the rear of the said plate and having integral symbols extending into the hollows formed by the embossed letters and integral projections extending into the said cutout portions, posts arranged for supporting the said glass plates, arms pivoted to the posts, the arms and posts being arranged in opposite pairs, and wires securing the adjacent ends of the arms together.

3. A license plate, comprising a plate having embossed symbols with central cutout portions, glass plates engaged in the rear of the said plate and having integral symbols extending into the hollows formed by the embossed letters and integral projections extending into the said cutout portions, posts projecting from the rear of the said plate and arranged for supporting the said glass plates, arms pivoted to the posts, the arms and posts being arranged in opposite pairs, and a means for securing the adjacent ends of the arms together.

4. A license plate, comprising a plate having embossed symbols with central cutout portions, glass plates engaged in the rear of the said plate and having integral symbols extending into the hollows formed by the embossed letters and integral projections extending into the said cutout portions, and arms movably mounted and arranged for holding the glass plates in place, the said arms being pivoted at one of their ends.

In testimony whereof I have affixed my signature.

JOHN M. MOORE.